United States Patent Office 2,792,924
Patented May 21, 1957

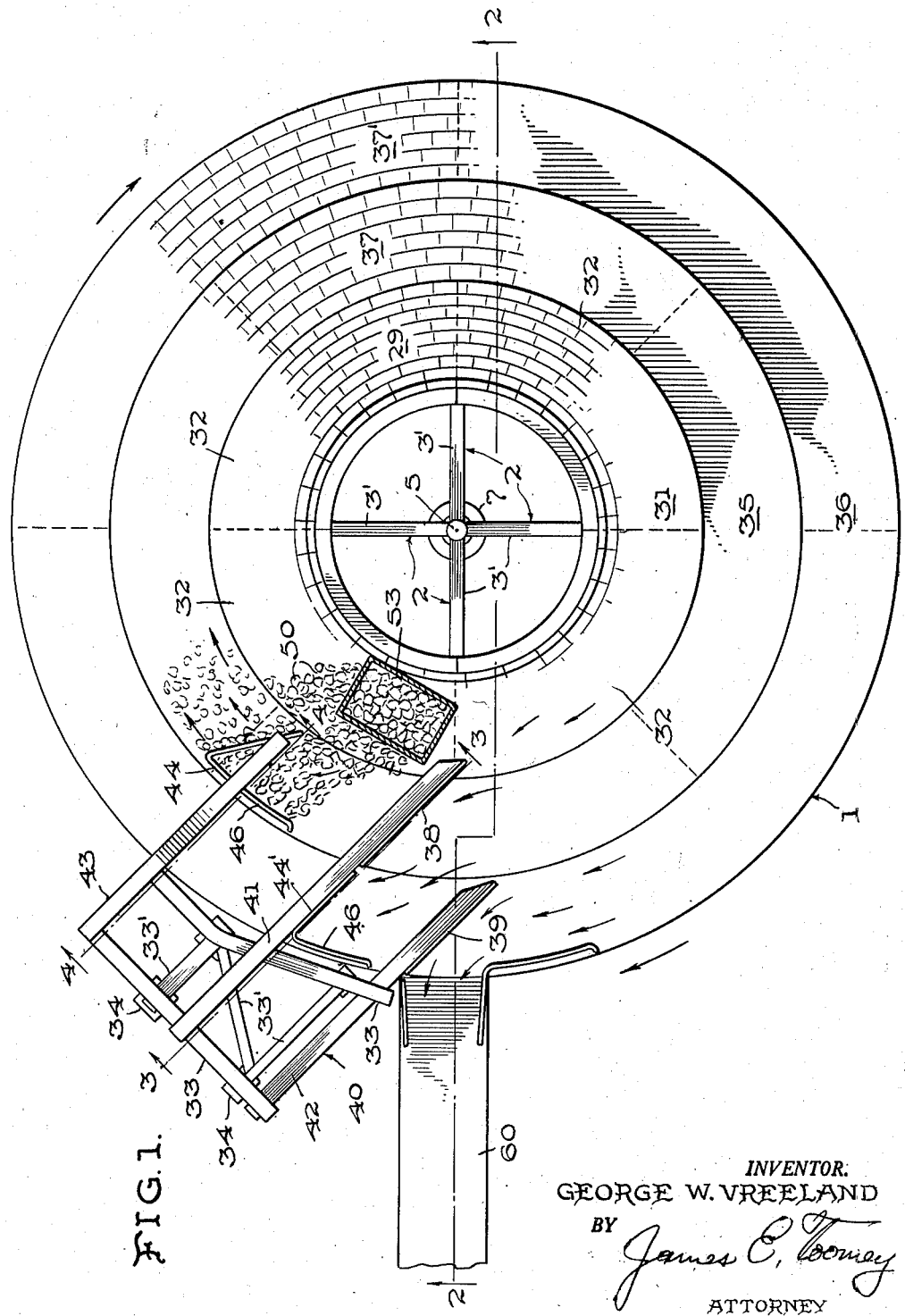

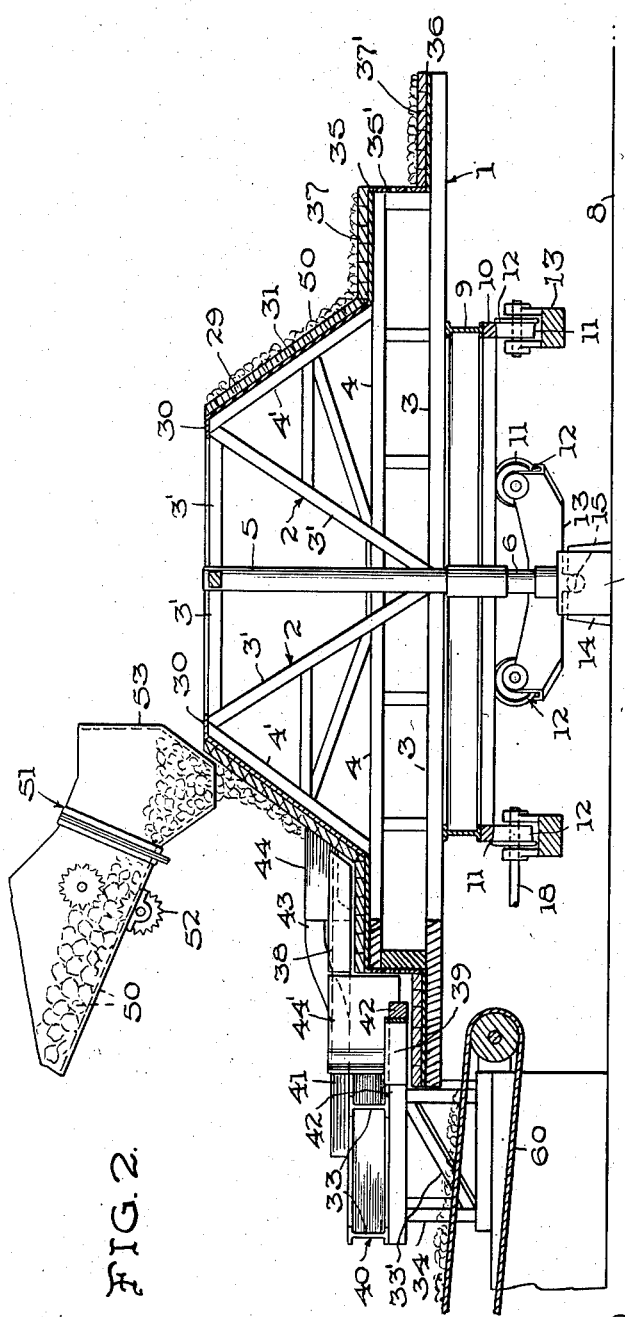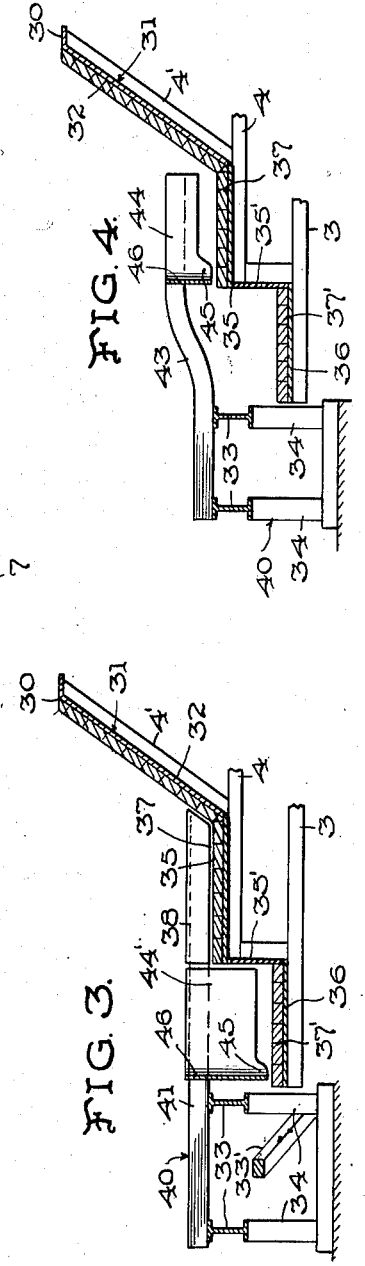

2,792,924
COOLING DEVICE

George W. Vreeland, Oakland, Calif., assignor, by mesne assignments, to Kaiser Steel Corporation, Oakland, Calif., a corporation of Nevada Application May 19, 1954, Serial No. 430,779

7 Claims. (Cl. 198—84)

This invention relates to an apparatus for cooling heated material. More particularly, it is concerned with providing a novel apparatus for cooling heated sinter material and the like.

During the processing of sinter material, it is subjected to comparatively high temperatures. When it is discharged from a sintering machine at high temperatures, serious problems are posed in the further handling of the same, particularly where it is to be transferred by conveyors to bins, railway cars, etc. Similar problems are also present in the processing of other heated materials such as coke, cement clinker and burnt lime.

The instant invention is designed to provide a novel apparatus for effectively cooling heated material, such as hot sinter material so that it may be conveniently handled by conveyors, hoppers, etc. during further processing of the same. The cooling device of the instant invention receives the hot sinter as it is discharged from a sinter machine in such a fashion that the heated material is spread by suitable means in successive, relatively thin layers upon a partially inclined and partially stepped rotating platform, and packing of the material is obviated. This spreading of the material on the platform results in use of the maximum amount of area for radiation of the heat from the sinter bed to the absorbing cooler body. In this arrangement, atmospheric air is used to great advantage in causing a rapid wiping of the body of material to be cooled with air. This wiping or rapid movement of the air over the body of sinter being cooled is caused by the natural draft created by the heat absorbed by the air from the hot sinter, and the particular manner in which the material is arranged on the platform.

Accordingly, one of the principal objects of this invention is to provide a novel cooling apparatus which is so constructed that the material being cooled, such as hot sinter, is given a maximum amount of exposure to the air for radiation of the heat therefrom, within a minimum amount of time.

It is another object of this invention to provide a novel cooling device comprising of a rotating platform wherein the material being cooled is passed down an inclined surface and thereafter spread in relatively thin layers upon a plurality of successive stepped surfaces, after which it is removed in a cooled condition.

It is another object of this invention to provide a novel rotary cooling device wherein heated sinter material and the like is first deposited upon an outwardly and downwardly inclined annular surface, which is inclined at an angle slightly less than the angle of repose of the material, thereby permitting the material to slide gradually down the surface toward a plurality of successive shelves as the head of material builds up on the inclined surface.

It is another object of this invention to provide novel means for resiliently mounting a rotating cooling platform.

It is a further object of this invention to provide a novel cooling device wherein the angle of repose of the material to be cooled is advantageously used in conjunction with an inclined surface located on the platform during the initial disposition of the material to be cooled, so as to permit the material to be spread in relatively thin successive layers upon a plurality of successive flat surfaces arranged concentrically with the inclined surface.

It is another object of this invention to provide a novel stepped cooling device wherein novel means are employed for spreading the material in fine, thin layers upon the steps of the platform.

The above objects are accomplished by providing in a cooling device for use in the atmospheric cooling of sinter material and the like, the combination of a rotatable wheel-like frame. A frusto-conical deck is advantageously mounted in the center of the frame for receiving the heated material initially deposited on the platform, and this deck is provided with an annular, outwardly and downwardly inclined surface. The angle of inclination of this deck is also advantageously made slightly less than the angle of repose of the material deposited on the platform. A plurality of concentrically disposed aprons, arranged in the manner of steps, are located adjacent the outer periphery of the frame with the innermost of these steps or aprons being located adjacent the bottom extremity of the deck. The several aprons are adapted to successively receive the material flowing down the inclined surface of the deck. Suitable means may be employed for spreading the material being cooled in a thin layer on each of the aprons, and plow means may also be used for removing the material from the outermost apron after it has been cooled. The platform may also be advantageously supported by flexibly mounted wheel assemblies, and certain of these wheel assemblies may, in turn, also be employed as the primary means for driving or rotating the platform.

Other objects and advantages of the instant invention will become more apparent from a review of the following detailed description when taken in conjunction with the appended drawings, wherein:

Figure 1 is a plan view of the novel cooling apparatus of the instant invention, with parts removed for the sake of clarity;

Figure 2 is a sectional view of the novel cooling apparatus of the instant invention shown in Figure 1, when taken along lines 2—2 thereof and with the details of a charging chute disclosed;

Figure 3 is a sectional view of a portion of the apparatus shown in Figure 1 when taken along lines 3—3 thereof; and Figure 4 is a sectional view of a portion of the apparatus shown in Figure 1 when taken along lines 4—4 thereof.

The rotating platform 1 of the instant invention may be advantageously constructed from a plurality of truss-like frame members 2. Each of these frame members 2 may be made up of beams 3, 3', 4 and 4', and other suitable reinforcing or bridging members. Truss-type frame members 2 are adapted to be arranged in the manner of wheel spokes with their inner extremities being connected to an upstanding column 5. Column 5 is advantageously affixed to a suitable shaft 6 rotatably mounted upon a standard or support 7 anchored in the ground 8 adjacent a sintering machine or the like. Affixed to the underside of the platform or wheel-like frame 1 formed by the truss-type frame members 2 is a track 9. Track 9 is provided with a trackway 10 having a beveled surface which is adapted to be engaged by the beveled treads 11 of the supporting wheels 12. These wheels also serve as the primary supports for the platform in either a loaded or unloaded condition. They are also advantageously disposed beneath the platform at the point where heaviest loading of the same occurs, at indicated in Fig. 1.

Each of the wheels 12 is rotatably mounted and affixed to one of the ends of an equalizing bar 13. In the preferred embodiment of the invention, three such equalizing bars 13 are employed and they are equally spaced from one another below the platform. Each of the equalizing bars 13 is suitably fulcrumed or pivotally mounted at its center on a support 14 by means of a shaft member 15. This tripod arrangement for supporting the platform provides for an even distribution of the weight of the loaded platform on all the wheel members 12.

The wheels 12 also advantageously serve to absorb any shocks or stresses upon the platform 1 which may be brought about by uneven loading of the same. At the same time, this arrangement of the wheels will compensate for any variations in the annular trackway 10 and will thus tend to equalize the load upon each of the wheels. Finally, this mounting arrangement for the wheels also serves to eliminate any serious shearing stresses on the central column 5.

In order to rotate the platform, one or more of the wheels 12 may be connected to an electric motor (not shown) through a series of shafts and flexible coupling members (not shown) which are ultimately connected to a drive shaft 18 upon which a wheel 12 is mounted as indicated in Fig. 2.

Mounted upon the upper portion of the wheel-like frame formed by the truss-type members 2 is a frusto-conical deck or wear-resistant surface 31 formed from a series of metal plates 32 secured to the truss-type members 2. The upper portion of plate 32 may be provided with an inturned lip portion 30. By referring to Fig. 1, it will be noted that surface 31 is inclined downwardly and outwardly on the platform 1. The angle of inclination of surface 31 is such that it is inclined downwardly at an angle slightly less than the angle of repose of the material initially discharged on the surface. Surface 31 may also be advantageously covered with a wear resistant refractory covering 29, if desired. The outer portion of the rotating platform 1 is comprised of a plurality of contiguous aprons 35 and 36 arranged in the form of steps along the outer periphery of the platform. These aprons or steps 35 and 36 are concentrically arranged with respect to one another and the deck 31 on the outer extensions of the frame members 2. They are also of annular configuration, and step 35 is contiguous with the inclined surface or deck 31. Each of the steps or aprons 35 and 36 may be advantageously covered by a heat resisting and wear resisting refractory covering 37 and 37'. An upright metallic wall 35', which may be perforated if desired as indicated in Fig. 2, also extends between aprons 35 and 36.

Overhanging the several steps 35 and 36 and in spaced relationship to one another, is a plurality of plow members 38 and 39. These plows are held in position and anchored to a suitable supporting framework 40 by means of suspension arms 41 and 42. Framework 40 is located off and to one side of the rotating platform 1 and is made up of frame members 33, 33' and 34. Plow 38 is employed to project the material from apron 35 onto apron 36 after one rotation of the platform. Plow 39 is employed to remove the finally cooled material off of apron 36 onto a suitable discharge conveyor 60.

Also affixed to the support assembly 40, as indicated particularly in Fig. 4, is a projecting arm 43. Attached to the inner extremity of arm 43 is spreader member 44 over-hanging apron or shelf 35. A second spreader member 44' overhangs shelf 36 and may be affixed to arm 41 adjacent plow 38. These spreaders may also be so formed that the outer extremities thereof are provided with a downwardly projecting portion 45. The use of the projection 45 on the several spreaders causes the spreaders to distribute the material on the inner side of each of the aprons or steps 35 and 36 in thin even layers so as to obtain a maximum amount of exposure of the material to the cooling air of the atmosphere.

Also attached at an angle to each of the spreader members 44 and 44' is a guard member 46. These guard members serve to prevent spillage of the material from the several aprons as it is being distributed thereon in thin layers by the spreader members 44 and 44'. It is also contemplated that the spreader and guard members 44, 44' and 46 may also be advantageously formed from a single piece of angularly bent metal.

By referring to the several figures, it will be noted that the operation of the cooling device is as follows. The heated material 50, such as sinter, passes from a sintering machine and is continuously discharged directly, in the form of large cakes or lumps, onto the inclined surface 31 of the platform as it rotates in a clockwise direction, through the medium of the overhead chute 51. Chute 51, spreaders 44, 44', and plows 38 and 39 are also arranged adjacent the rotating platform at substantially the same point.

For the purposes of breaking up any excessively large cakes or lumps of sinter material prior to the introduction of the sinter cakes onto the rotating platform, a pair of crushing rolls 52 is located adjacent the discharge spout 53 of chute 51. As the cakes or lumps of sinter material flow down the inclined surface 31, they brush against the first spreader 44. Spreader 44 causes the sinter cakes to flow outwardly along the surface of the topmost apron or step 35 and to be spread in a relatively thin layer of uniform thickness thereon. At the same time, the guard 46 effectively prevents any sinter cakes from rolling off the first apron 35 during the spreading operation. After one rotation of the bed of material on the platform, it is then engaged by the first plow 38 and projected outwardly upon the surface of the second or outermost apron 36, where it is again spread in a relatively thin band or layer of uniform thickness by the second spreader 44'. Thereafter, upon the second rotation of the platform, the finally cooled material is discharged by means of plow 39 onto a suitable discharge conveyor 60. Thus, during two complete revolutions of the platform 1, the bed of sinter material 50 is progressively cooled as it is moved down the inclined surface 31 and across the steps or aprons 35 and 36, from which it is then transferred to a discharge conveyor in a suitably cooled condition for further handling.

It is also to be observed that by inclining the surface or deck 31 in such a way that the angle of inclination is slightly less than the angle of repose of the sinter material 50 being cooled, that the material will flow in an even rate down the inclined surface and onto the first step 35. The particular angle of inclination of the deck also permits a layer of sinter material to be built up upon the deck 31 by the sinter taking its natural angle of repose until the head of material becomes so great that it causes the material to move in a uniform stream or layer downwardly along the deck 31 and onto the first apron 35. This action takes place as the cooling device is constantly rotated and as the material is discharged thereon in a continuous manner from chute 51.

Although only two aprons are disclosed for receiving the material progressively flowing down the inclined surface 31, it is obvious that any number may be employed, depending upon the results desired.

The stepped arrangement of the aprons in the cooling device of the instant invention also causes the cooling air of the atmosphere to wipe over the thin layers of the material being cooled in a most advantageous fashion. Since the material in each layer is also in the form of irregular lumps or cakes, the cooling air from the atmosphere not only passes over the several layers of material, but also through the interstices between the lumps in each layer with a wiping action. This in turn raises and causes a chimney effect or natural convection of air over the entire cooler from the outermost to the innermost periphery thereof, thereby pulling large quantities of air over and through all the relatively thin layer of sinter material, thereby rapidly cooling the same. The perforations in wall 35' also aid in bringing about this particular circulation of the cooling air.

In addition, the placing of the material on the platform 1 in successive, relatively thin layers results in a disposition of relatively small amounts of sinter at any one place on the cooling device. This reduces the overall weight of the device, as well as uneven loads on the trackway and wheels. The thin layers of sinter also allows a maximum surface for radiation compared to the volume of sinter disposed on the platform. Consequently, a lighter structure can be used with less weight being exerted on the bearings and wheels supporting the circular cooler.

An advantageous embodiment of the invention has been herein disclosed and described. It is obvious that various changes and modifications may be made therein without departing from the spirit and scope thereof as defined by the appended claims, wherein what is claimed is:

1. In a device for use in the atmospheric cooling of hot sinter material and the like, the combination of a rotatable wheel-like frame, an unobstructed frusto-conical material receiving deck mounted on the center of said frame, said deck also being inclined outwardly and downwardly, the angle of inclination of said deck being slightly less than the angle of repose of the material discharged thereon such that the material slides progressively downwardly and outwardly on said deck, a plurality of concentric aprons arranged in the manner of steps on the outer periphery of said frame adjacent the bottom extremity of said deck for successively receiving material flowing down the inclined surface of the deck, spreader means urging the deposit material being cooled in a thin layer on each of the said aprons, one said spreader means including plow means mounted on a common frame for removing the material from its previous position on an apron to the next adjacent apron after a single revolution of the wheel-like frame and further plow means for removing the material from the outermost of said aprons upon the cooling of said material.

2. The combination defined in claim 1, and including common means for flexibly supporting and rotating said frame.

3. In a device for use in the atmospheric cooling of hot sinter material and the like, the combination of a rotatable wheel-like frame, an unobstructed frusto-conical downwardly and outwardly inclined deck centrally supported on said frame, the angle of inclination of said deck being slightly less than the angle of repose of the material discharged thereon whereby the material slides progressively downwardly and outwardly on said deck, a plurality of concentric aprons arranged in the manner of contiguous steps on the outer periphery of said frame and adjacent the bottom extremity of said deck for successively receiving the material flowing down the inclined surface of the deck, a trackway affixed to the undersurface of said frame, spreader means for distributing the material being cooled in a thin layer on each of the said aprons, plow means for removing the material in a cooled state from each of said concentric aprons, and flexible support means engaging the trackway affixed to the undersurface of said frame.

4. In a device for use in the atmospheric cooling of hot sinter material and the like, the combination of a wheel-like frame, common means for rotating and supporting said frame, an unobstructed frusto-conical downwardly and outwardly inclined deck mounted in the center of said frame, the angle of inclination of said deck also being slightly less than the angle of repose of the material discharged thereon, the lowermost edge of said deck terminating in a plurality of concentric aprons arranged in the manner of contiguous steps on the outer periphery of said frame for successively receiving the material flowing down the inclined surface of the deck, spreader means overlying said aprons for distributing the material being cooled in a thin layer on each of said aprons, guard means located adjacent said spreader means for preventing spillage of material off of said aprons during the distribution of material thereon, and a plurality of plows overlying each of said aprons for successively moving the material being cooled from one apron to another and for removing the material from the outermost apron onto a discharge conveyor upon each complete revolution of said device.

5. In a cooling apparatus of the type described, the combination of a rotatable platform provided with a centrally located, unobstructed, annular, downwardly and outwardly inclined surface, and a plurality of concentrically and contiguously arranged annular stepped flat surfaces mounted along the outer periphery thereof, the innermost of said stepped surfaces being contiguous with the bottom extremity of said downwardly and outwardly inclined surface, said stepped and inclined surfaces also being provided with a refractory covering, said centrally located inclined surface having an angle of inclination which is slightly less than the angle of repose of the material deposited thereon, spreader means distributing the material being cooled in thin even layers on each of said stepped surfaces, plow means for removing cooled material from each of said stepped surfaces, annular track means affixed to the underside of said platform, and a plurality of circumferentially and flexibly mounted wheel assemblies including inverted, pivotally mounted yoke-like wheel supports engaging said track means for supporting and rotating said platform.

6. The combination defined in claim 5, including perforated wall means connecting said stepped surfaces.

7. The combination defined in claim 1, including perforated wall means connecting successive aprons.

References Cited in the file of this patent

UNITED STATES PATENTS

| | | |
|---|---|---|
| 361,590 | Johnson | Apr. 19, 1887 |
| 2,480,727 | Greyson | Aug. 30, 1949 |
| 2,641,064 | Foner | June 9, 1953 |